(12) United States Patent
Takahashi et al.

(10) Patent No.: US 10,469,823 B2
(45) Date of Patent: Nov. 5, 2019

(54) IMAGE APPARATUS FOR DETECTING ABNORMALITY OF DISTANCE IMAGE

(71) Applicant: FANUC CORPORATION, Yamanashi (JP)

(72) Inventors: Yuuki Takahashi, Yamanashi (JP); Atsushi Watanabe, Yamanashi (JP); Minoru Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/946,297

(22) Filed: Apr. 5, 2018

(65) Prior Publication Data
US 2018/0295342 A1  Oct. 11, 2018

(30) Foreign Application Priority Data

Apr. 7, 2017 (JP) ................. 2017-077040

(51) Int. Cl.
*H04N 13/128* (2018.01)
*G06T 7/80* (2017.01)
(Continued)

(52) U.S. Cl.
CPC .......... *H04N 13/128* (2018.05); *G01S 7/497* (2013.01); *G01S 17/08* (2013.01); *G01S 17/36* (2013.01); *G01S 17/46* (2013.01); *G01S 17/87* (2013.01); *G01S 17/89* (2013.01); *G06T 1/0014* (2013.01); *G06T 7/0004* (2013.01); *G06T 7/521* (2017.01); *G06T 7/593* (2017.01); *G06T 7/85* (2017.01); *H04N 13/156* (2018.05);
(Continued)

(58) Field of Classification Search
CPC ......... G06T 1/0014; G06T 2207/10021; G06T 2207/10028; G06T 2207/30164; G06T 2207/30168; G06T 2207/30204; G06T 7/0004; G06T 7/521; G06T 7/593; G06T 7/85; H04N 13/128; H04N 13/156; H04N 13/254; H04N 2013/0081
See application file for complete search history.

(56) References Cited

U.S. PATENT DOCUMENTS

2007/0013868 A1*  1/2007  Pugach ............... A61B 3/0091
                                                              351/209
2008/0106620 A1*  5/2008  Sawachi ............. H04N 13/239
                                                              348/262
(Continued)

FOREIGN PATENT DOCUMENTS

CN        101310194 A       11/2008
CN        103477186 A       12/2013
(Continued)

*Primary Examiner* — Md N Haque
(74) *Attorney, Agent, or Firm* — Hauptman Ham, LLP

(57) ABSTRACT

An image processing device of an image apparatus includes a distance image generation unit that generates a first distance image and a second distance image from the output signals of a first camera and a second camera based on flight times of light. The image processing device includes a stereo image generation unit that generates a stereo image from the output signals of the cameras. The image processing device includes an image comparison unit that compares the stereo image and the distance image and detects an abnormality of at least one of the first distance image and the second distance image.

6 Claims, 6 Drawing Sheets

(51) Int. Cl.
  *H04N 13/156* (2018.01)
  *H04N 13/254* (2018.01)
  *G06T 1/00* (2006.01)
  *G06T 7/00* (2017.01)
  *G06T 7/521* (2017.01)
  *G06T 7/593* (2017.01)
  *H04N 13/271* (2018.01)
  *G01S 17/08* (2006.01)
  *G01S 17/36* (2006.01)
  *G01S 17/46* (2006.01)
  *G01S 17/87* (2006.01)
  *G01S 17/89* (2006.01)
  *G01S 7/497* (2006.01)
  *H04N 13/00* (2018.01)

(52) U.S. Cl.
  CPC ......... *H04N 13/254* (2018.05); *H04N 13/271* (2018.05); *G06T 2207/10021* (2013.01); *G06T 2207/10028* (2013.01); *G06T 2207/30164* (2013.01); *G06T 2207/30168* (2013.01); *G06T 2207/30204* (2013.01); *H04N 2013/0081* (2013.01)

(56) References Cited

U.S. PATENT DOCUMENTS

| | | | | |
|---|---|---|---|---|
| 2008/0273758 | A1* | 11/2008 | Fuchs | G01C 11/06 382/106 |
| 2009/0015663 | A1* | 1/2009 | Doettling | F16P 3/14 348/46 |
| 2009/0268029 | A1* | 10/2009 | Haussmann | F16P 3/14 348/153 |
| 2012/0188235 | A1* | 7/2012 | Wu | G06T 7/50 345/419 |

FOREIGN PATENT DOCUMENTS

| | | |
|---|---|---|
| DE | 10245720 A1 | 4/2004 |
| DE | 102009046108 A1 | 5/2011 |
| DE | 102013007886 B3 | 9/2014 |
| JP | 2009-47497 A | 3/2009 |
| JP | 2009-516157 A | 4/2009 |
| JP | 4939901 B2 | 5/2012 |
| WO | 2007/054359 A2 | 5/2007 |
| WO | 2016/133053 A1 | 8/2016 |
| WO | 2016/199244 A1 | 12/2016 |

* cited by examiner

IMAGE APPARATUS FOR DETECTING ABNORMALITY OF DISTANCE IMAGE

RELATED APPLICATIONS

The present application claims priority to Japanese Patent Application No. 2017-077040 filed on Apr. 7, 2017, the disclosure of which is hereby incorporated by reference herein in its entirety.

BACKGROUND OF THE INVENTION

1. Field of the Invention

The present invention relates to an image apparatus for detecting an abnormality of a distance image.

2. Description of the Related Art

An image apparatus that captures an image by means of a camera and detects a three-dimensional position of an object based on the captured image is known. As the image apparatus for detecting the three-dimensional position, an apparatus that causes a pixel sensor to receive light that is reflected on the surface of an object after a light source emits light is known. The image apparatus measures the time during which the light emitted from the light source is reflected on the surface of the object and then returns to the pixel sensor. The image apparatus can calculate a distance to the object based on the measured time and the speed of light. This method of the image apparatus is referred to as a time-of-light flight method.

Japanese Unexamined Patent Application Publication No. 2009-516157A discloses an apparatus that monitors a spatial region including an illuminator, a first image recording unit that records a first image, and a second image recording unit that records a second image. The first image recording unit includes a pixel sensor that captures an image of the spatial region. The second image recording unit includes a pixel sensor that captures an image of the spatial region. This apparatus compares the first image and the second image so as to identify an erroneous distance value of a point in the spatial region imaged on at least one pixel.

SUMMARY OF THE INVENTION

A distance image captured according to the time-of-light flight method includes information on the distance from a camera to an object. However, secular change in the camera or light source may cause an error in the distance to the object. This may lead to a position error when the image apparatus detects the position of the object.

Moreover, the image apparatus has characteristics which are influenced by the temperature of the surrounding environment. The light source, in particular, for emitting the light to the object is affected by peripheral temperature. The light emission timing of the light source may deviate from a predetermined timing when the temperature changes. Thus, the image apparatus may not correctly measure the distance when the temperature changes.

In this way, the distance image generated by the image apparatus may include errors and thus the image apparatus is preferably capable of detecting abnormality in the distance image.

An image apparatus according to an aspect of the present disclosure includes a first imaging unit that captures an image and a second imaging unit that is disposed at a predetermined position relative to the first imaging unit and that captures an image. The image apparatus includes a first light source that emits light to the area in which the first imaging unit captures the image, and a second light source that emits light to the area in which the second imaging unit captures the image. The image apparatus includes an image processing unit that processes the output signal of the first imaging unit and the output signal of the second imaging unit. The image processing unit includes a first distance image generation unit that generates a first distance image including distance information from the output signal of the first imaging unit based on a flight time of light, and a second distance image generation unit that generates a second distance image including distance information from the output signal of the second imaging unit according to a flight time of light. The image processing unit includes a first two-dimensional image generation unit that generates a first two-dimensional image from the output signal of the first imaging unit, and a second two-dimensional image generation unit that generates a second two-dimensional image from the output signal of the second imaging unit. The image processing unit includes a stereo image generation unit that generates a stereo image including distance information based on the first two-dimensional image and the second two-dimensional image. The image processing unit includes an image comparison unit that compares the stereo image and at least one of the first distance image, and the second distance image and detects abnormality of at least one of the first distance image and the second distance image.

DETAILED DESCRIPTION

Referring to FIGS. 1 to 7, an image apparatus according to an embodiment will be described below. The image apparatus according to the present embodiment can capture a distance image including information on a distance from a camera to an object or a person to be captured. Moreover, the image apparatus according to the present embodiment is disposed in a robot system including a robot for performing a predetermined operation.

Figure 1:
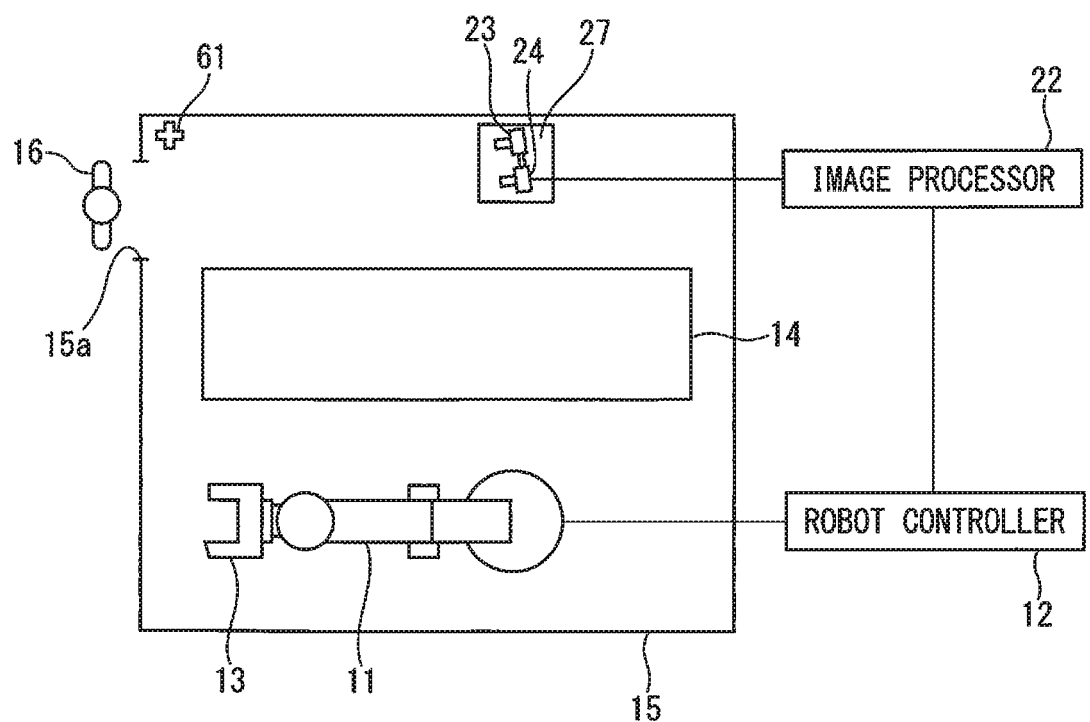
FIG. 1 is a schematic plan view of a robot system according to an embodiment.
Figure 2:
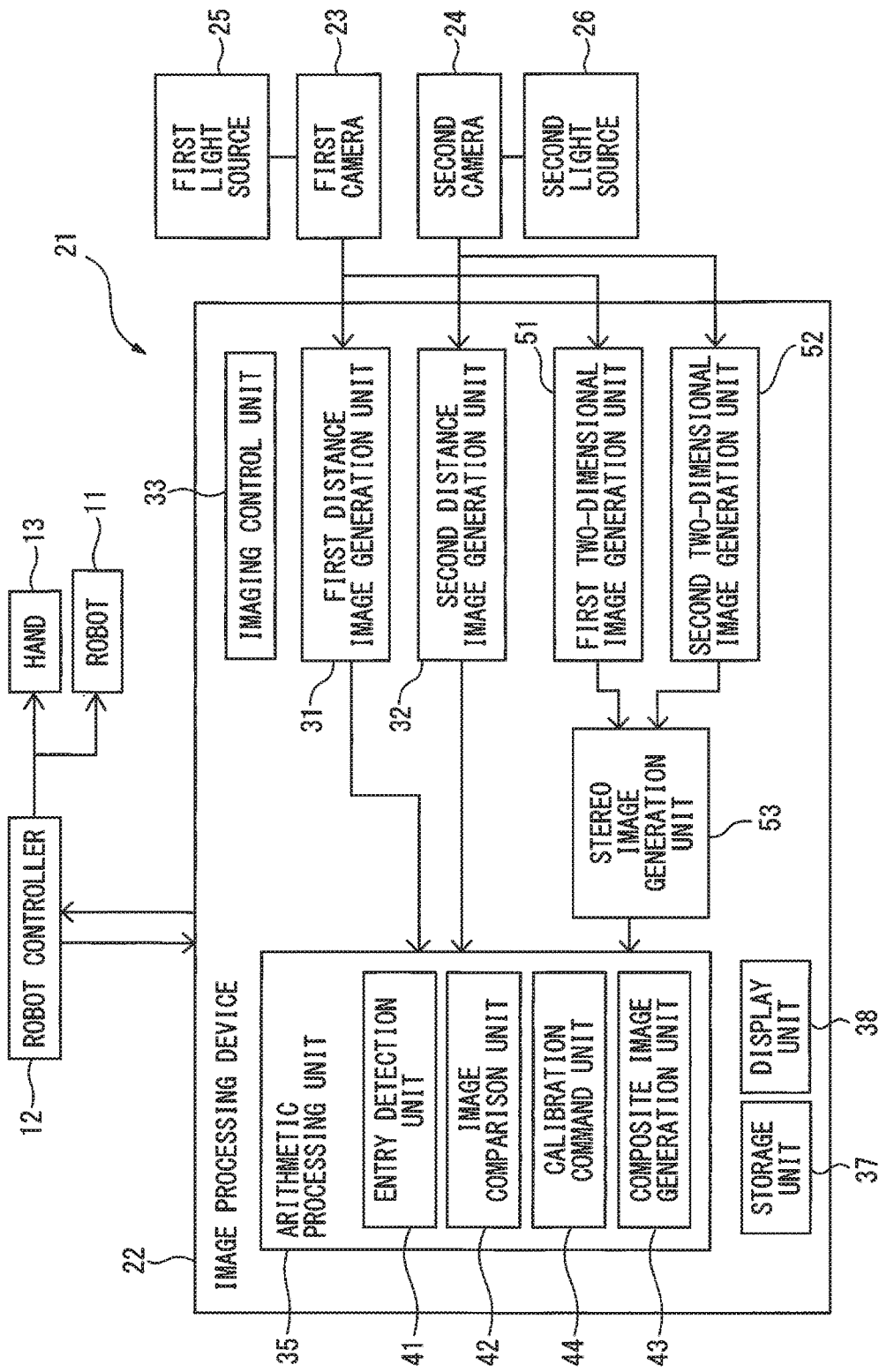
FIG. 2 is a block diagram of the robot system according to the embodiment.

FIG. 1 is a schematic plan view showing the robot system according to the present embodiment. FIG. 2 shows a block diagram of the robot system according to the present embodiment. Referring to FIGS. 1 and 2, the robot system of the present embodiment includes a robot 11 that performs the predetermined operation and a robot controller 12 that controls the robot 11.

The robot 11 is connected to a hand 13 serving as an end effector. The robot 11 of the present embodiment performs an operation on a workpiece on a work table 14. The operations performed by the robot 11 include the sorting of workpieces and the transfer of workpieces. Alternatively, the robot can perform any operation. For example, the operation performed by the robot includes welding or painting. The end effector is a device that is selected for an operation performed by the robot.

The robot controller 12 is composed of, for example, an arithmetic processing device (digital computer) including a CPU (Central Processing Unit), RAM (Random Access Memory) and ROM (Read-Only Memory) that are connected to the CPU via a bus. The robot controller 12 transmits an action command to the robot 11 and the hand 13.

Around the robot 11, an operation area is set as an area in which the robot 11 performs the operation. The operation area is set for safety. For example, the operation area is set so as to prevent an operator or a transfer vehicle from coming into contact with the robot 11 during the operation of the robot 11. In the present embodiment, a fence 15 is disposed so as to define the operation area. The fence 15 has an entrance part 15a. The operator 16 can enter the operation area surrounded by the fence 15 from the entrance part 15a. The operator 16 preferably keeps out of the fence 15 during a period in which the robot 11 is driven.

The robot system according to the present embodiment includes an image apparatus 21. The image apparatus 21 detects entry of the operator 16 into the operation area during the period in which the robot 11 is driven. Moreover, the image apparatus 21 detects an exit of the operator 16 from the operation area. When the operator 16 enters the operation area, the robot controller 12 of the present embodiment performs a control so as to stop the robot 11 and the hand 13.

Figure 3:
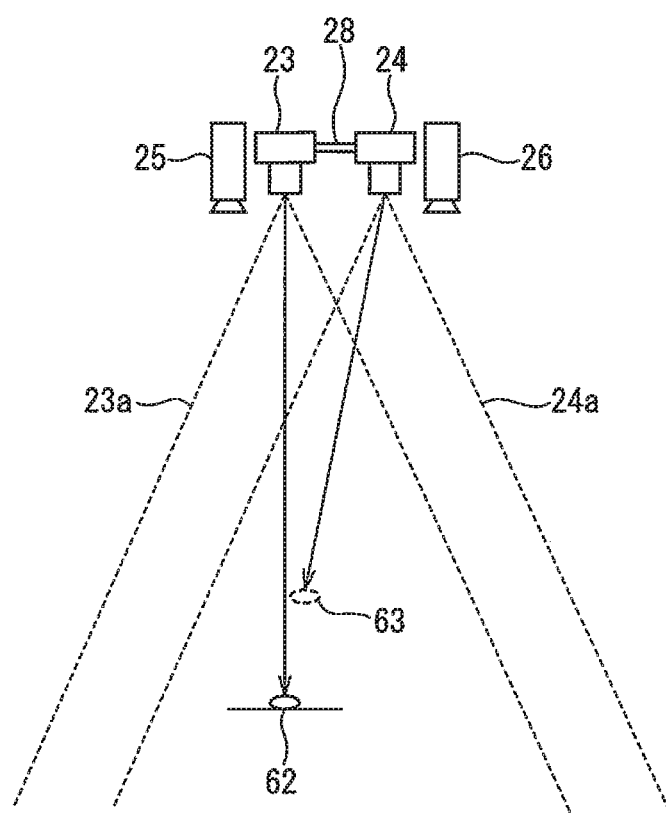
FIG. 3 is a schematic plan view showing two cameras and an object for illustrating a distance error in a distance image.

FIG. 3 is a schematic plan view showing a camera, a light source, and an object to be imaged. Referring to FIGS. 1 to 3, the image apparatus 21 of the present embodiment detects entry of the operator 16 from the entrance part 15a into the area surrounded by the fence 15. The image apparatus 21 includes a first camera 23 serving as a first imaging unit for capturing an image of a predetermined area and a second camera 24 serving as a second imaging unit for capturing an image of the predetermined area. The first camera 23 and the second camera 24 are fixed on a pedestal 27.

In the image apparatus 21 of the present embodiment, the two cameras 23 and 24 are disposed in consideration of an increase in the measurement error of a distance image and a fault of the cameras. In other words, the image apparatus 21 of the present embodiment includes the multiple cameras 23 and 24 in view of safety in the event of a malfunction of one of the cameras.

The relative positions of the first camera 23 and the second camera 24 are determined in advance. In other words, the second camera 24 is disposed at a predetermined position relative to the first camera 23. The first camera 23 and the second camera 24 are fixed to a support member 28 of the pedestal 27. The first camera 23 and the second camera 24 are disposed so as to capture an image of a predetermined common area. The first camera 23 and the second camera 24 are disposed such that an imaging range 23a and an imaging range 24a overlap each other.

The first camera 23 and the second camera 24 of the present embodiment are disposed such that the entrance part 15a is included in the imaging ranges 23a and 24a. In other words, the first camera 23 and the second camera 24 are located at a position in which an image of the operator 16 passing through the entrance part 15a can be captured.

The image apparatus 21 includes a first light source 25 that emits light to the area in which the first camera 23 captures an image. The first light source 25 emits light when the first camera 23 captures the image. The image apparatus 21 includes a second light source 26 that emits light to the area in which the second camera 24 captures an image. The second light source 26 emits light when the second camera 24 captures the image.

The first camera 23 and the second camera 24 are cameras that capture distance images according to a time-of-light flight method. The first camera 23 and the second camera 24 are also referred to as TOF (Time-Of-Flight) cameras. Each of the first camera 23 and the second camera 24 includes a pixel sensor. The pixel sensor may be any pixel sensor that can capture a distance image and a two-dimensional image. For example, the pixel sensor may be a CMOS (Complementary Metal-Oxide-Semiconductor) sensor.

The image apparatus 21 includes an image processing device 22 serving as an image processing unit for processing the output signal of the first camera 23 and the output signal of the second camera 24. The image processing device 22 can be composed of an arithmetic processing device including a CPU, a ROM, a RAM, and the like.

The image processing device 22 includes a storage unit 37 that stores information at the time when the images of the cameras 23 and 24 are processed. The storage unit 37 stores, for example, a judgement value for judging the distance image. The image processing device 22 includes a display unit 38 that displays information relating to the images of the cameras 23 and 24. The display unit 38 is formed by a liquid crystal display panel and the like. The display unit 38 can display, for example, a captured distance image or a captured stereo image. Furthermore, the display unit 38 can display a warning, the judgement value, and the like.

The image processing device 22 includes an imaging control unit 33 that controls the first camera 23, the second camera 24, the first light source 25, and the second light source 26. The imaging control unit 33 transmits a command for capturing the images to the first camera 23 and the second camera 24. The imaging control unit 33 controls the first light source 25 so as to emit light several times when the first camera 23 captures the image. Moreover, the imaging control unit 33 controls the second light source 26 so as to emit light several times when the second camera 24 captures the image.

The image processing device 22 includes a first distance image generation unit 31 that generates a first distance image from the output signal of the first camera 23 based on a flight time of light. The distance image includes information on a distance from the camera to an imaged object. The image processing device 22 includes a second distance image generation unit 32 that generates a second distance image from the output signal of the second camera 24 based on a flight time of light. The distance image generation units 31 and 32 calculate the propagation time of light and then calculate distances from the respective cameras 23 and 24 to an imaged object. The distance image generation units 31 and 32 measure the time during which light is emitted from the light sources 25 and 26 and returns to the cameras 23 and 24. For example, the distance image generation units 31 and 32 detect a phase difference of light and calculate the time during which light is reflected by the object and returns to the cameras 23 and 24. The distance image generation units 31 and 32 receive signals generated by the pixel sensor of the first camera 23 and the pixel sensor of the second camera 24, and generate distance images that correspond to the respective cameras. Furthermore, the distance image generation units 31 and 32 can calculate the position of any point included in an image, based on a distance to the point.

The image processing device 22 includes an arithmetic processing unit 35 that processes distance images captured by the first camera 23 and the second camera 24. The arithmetic processing unit 35 includes an entry detection unit 41 that detects entry of the operator 16 into the operation area based on the first distance image and the second distance image. The entry detection unit 41 detects a position of the operator 16 in each of the distance images. If the operator 16 moves into the operation area in at least one of the first distance image and the second distance image, the entry detection unit 41 can determine that the operator 16 has entered the operation area. The entry detection unit 41 can determine the entry of the operator by using the first distance image and the second distance image under any control.

When the operator 16 enters the operation area, the entry detection unit 41 transmits a signal to the robot controller 12 in order to inform of the entry of the operator. The robot controller 12 stops the driving of the robot 11 and the hand 13. Alternatively, the robot controller 12 may perform a control so as to reduce operation speeds of the robot 11 and the hand 13.

The entry detection unit 41 can detect the exit of the operator 16 from the operation area. The entry detection unit 41 of the present embodiment determines that the operator 16 has exited from the operation area when the operator 16 moves out of the operation area in both distance images of the first distance image and the second distance image. Moreover, the entry detection unit 41 can detect the exit of the operator 16 from the operation area by using the first distance image and the second distance image under any control.

The entry detection unit 41 transmits a signal to the robot controller 12 in order to inform of the exit of the operator. The robot controller 12 restarts the driving of the robot 11 and the hand 13. Alternatively, the robot controller 12 may perform a control so as to return the operation speeds of the robot 11 and the hand 13 to original speeds. When the operator 16 moves out of the entrance part 15a of the fence 15, the operator 16 may inform the robot controller 12 of the exit of the operator 16 by pressing a predetermined button of the robot controller 12.

In this way, the image processing device 22 of the present embodiment can detect the positions of an object and a person in an image. Alternatively, the image processing device 22 can detect the presence or absence of the object and the person in a predetermined area.

Referring to FIG. 3, the first camera 23 can capture the image of the object or the person in the area of the imaging range 23a. The second camera 24 can capture the image of the object or the person in the imaging range 24a. In this example, an object 62 will be discussed. The distance image generation units 31 and 32 can detect distances from the cameras 23 and 24 to the object 62 based on the distance images captured by the cameras 23 and 24.

However, the cameras 23 and 24 and the light sources 25 and 26 may be susceptible to ambient temperature. The influence of temperature is referred to as temperature drift. Furthermore, the distance to the object 62 may not be detected correctly due to aging deterioration of the cameras 23 and 24. In the example of FIG. 3, the distance to the object 62 can be correctly detected in the first distance image that is captured by the first camera 23, whereas in the second distance image that is captured by the second camera 24, the distance to the object 62 cannot be measured correctly due to aging deterioration of the second camera 24. In the second distance image, the measured distance from the second camera 24 to the object 62 is shorter than an actual distance. Thus, in the second distance image, the detected object 62 appears to be located at position 63.

Referring to FIG. 2, the image processing device 22 of the present embodiment is formed so as to detect an abnormality of at least one of the first distance image and the second distance image. The first camera 23 and the second camera 24 of the present embodiment can output a grayscale signal in pixel of the respective pixel sensors. The image processing device 22 includes a first two-dimensional image generation unit 51 that generates a first two-dimensional image from the output signal of the first camera 23 and a second two-dimensional image generation unit 52 that generates a second two-dimensional image from the output signal of the second camera 24. In the present embodiment, the relative positions of the first camera 23 and the second camera 24 are determined in advance. Moreover, a stereo image including distance information can be generated based on the relative positions and the two two-dimensional images. The image processing device 22 includes a stereo image generation unit 53 that generates a stereo image based on the first two-dimensional image and the second two-dimensional image. The stereo image is a distance image including distance information on the part included in images.

The arithmetic processing unit 35 includes an image comparison unit 42 that compares multiple images. Temperature drift may occur in a distance image captured according to the time-of-light flight method. However, a stereo image is hardly susceptible to temperature drift and secular change of the cameras, allowing for correct calculation of the distance to the object. In the present embodiment, distance information included in the stereo image is used as correct distance information. The image comparison unit 42 determines whether the first distance image is abnormal or not by comparing the stereo image and the first distance image. Furthermore, the image comparison unit 42 determines whether the second distance image is abnormal or not by comparing the stereo image and the second distance image.

The arithmetic processing unit 35 includes a calibration command unit 44 that transmits a command for calibrating the image to at least one of the first distance image generation unit 31 and the second distance image generation unit 32. The calibration command unit 44 transmits the calibration command to the distance image generation unit that has generated the abnormal distance image.

Figure 4:
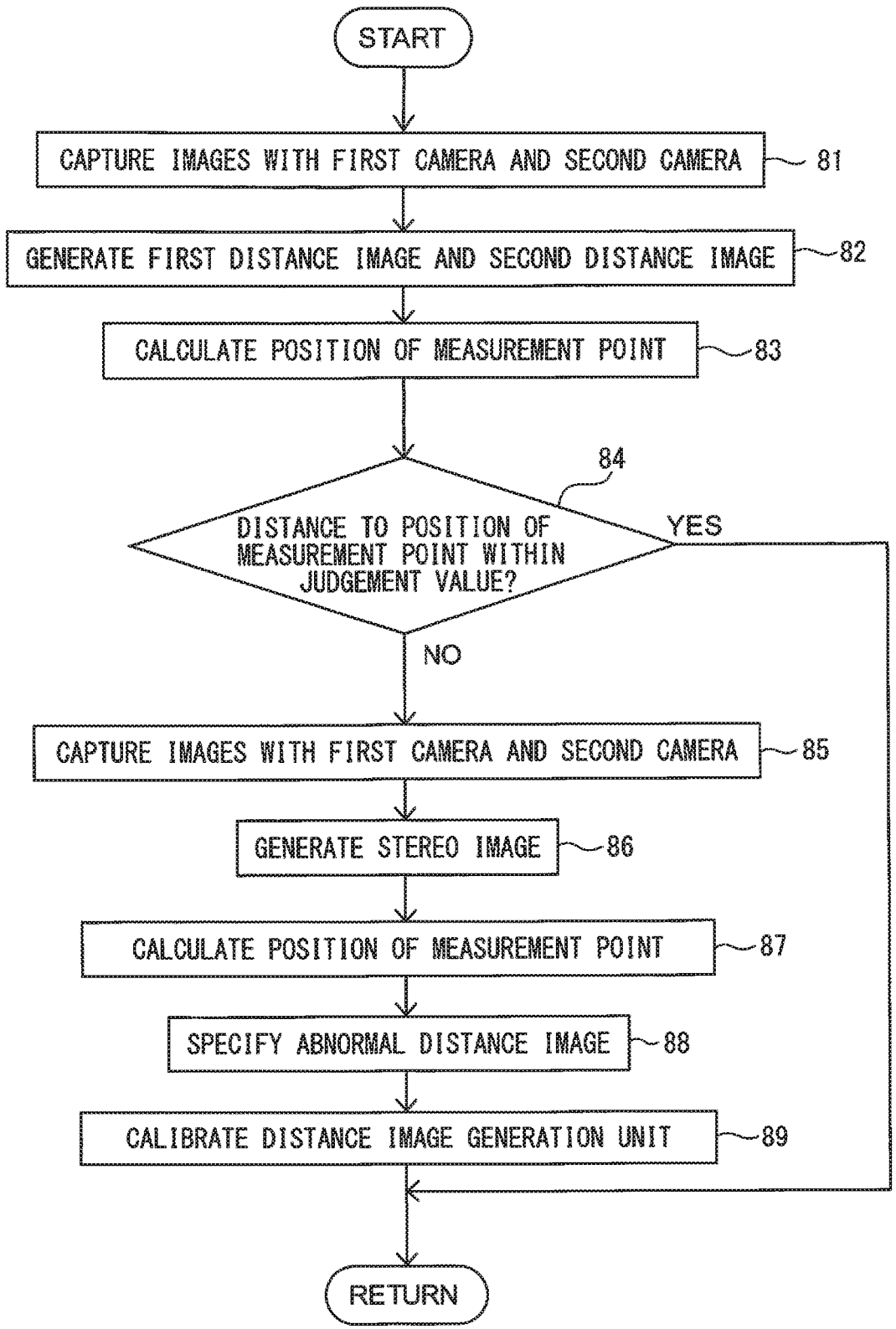
FIG. 4 is a flowchart showing control in which a distance image having an abnormality is detected and the distance image is then calibrated.

FIG. 4 is a flowchart of control for detecting the abnormality of the distance image in the image apparatus of the present embodiment. The control in FIG. 4 can be performed in any period. Alternatively, the control in FIG. 4 can be performed at predetermined time intervals.

Referring to FIGS. 2 and 4, in step 81, the first camera 23 and the second camera 24 capture the images. The imaging control unit 33 controls the first light source 25 and the first camera 23 so as to capture the image. After that, the imaging control unit 33 controls the second light source 26 and the second camera 24 so as to capture the image. In step 82, the first distance image generation unit 31 generates the first distance image based on the output signal of the first camera 23. The second distance image generation unit 32 generates the second distance image based on the output signal of the second camera 24.

Subsequently, in step 83, the distance image generation units 31 and 32 each calculate the position of a predetermined measurement point included in the distance image. Referring to FIGS. 1 and 3, in the present embodiment, a marker 61 is disposed as a measurement point for detecting abnormality of the distance image. The marker 61 of the present embodiment does not move. The marker 61 is disposed in the imaging ranges 23a and 24a of the cameras 23 and 24.

Referring to FIGS. 2 and 4, the distance image generation units 31 and 32 each calculate the position of the marker 61 based on the respective distance images. The distance images include information on distances from the cameras 23 and 24 to the measurement point. The distance image generation units 31 and 32 can calculate the position of the measurement point based on distances from the cameras 23 and 24 to the measurement point and the positions of the cameras 23 and 24. The position of the measurement point can be set by a predetermined coordinate system. The first distance image generation unit 31 detects the position of the marker 61 based on the first distance image. The second distance image generation unit 32 detects the position of the marker 61 based on the second distance image.

In step 84, the image comparison unit 42 of the arithmetic processing unit 35 compares the position of the marker 61 based on the first distance image and the position of the marker 61 based on the second distance image. The image comparison unit 42 calculates the distance between the position of the measurement point based on the first distance image and the position of the measurement point based on the second distance image. The image comparison unit 42 can determine that the first distance image and the second distance image are normal if the distance between the position of the marker 61 based on the first distance image and the position of the marker 61 based on the second distance image is not larger than a judgement value. In this case, the control is terminated.

If the distance between the position of the marker 61 based on the first distance image and the position of the marker 61 based on the second distance image is larger than the judgement value, the image comparison unit 42 determines that at least one of the first distance image and the second distance image has an abnormality. In this case, the control proceeds to step 85. Subsequently, the image processing device 22 generates the stereo image based on the output signal of the first camera 23 and the output signal of the second camera 24.

In step 85, the imaging control unit 33 controls the first camera 23 and the second camera 24 so as to capture a two-dimensional image. The first two-dimensional image generation unit 51 generates the first two-dimensional image based on the output signal of the pixel grayscale of the first camera 23. The second two-dimensional image generation unit 52 generates the second two-dimensional image based on the output signal of the pixel grayscale of the second camera 24. In this way, the two-dimensional image generation units 51 and 52 generate the respective two-dimensional grayscale images by using the outputs of the pixel sensors included in the cameras 23 and 24.

In step 86, the stereo image generation unit 53 generates the stereo image by using the first two-dimensional image and the second two-dimensional image. The stereo image generation unit 53 generates the stereo image based on the positions of the two cameras 23 and 24 and a parallax in the two two-dimensional images. The stereo image is the distance image including information on the distance to the object included in the image. In step 87, the stereo image generation unit 53 calculates the position of the marker 61 based on the distance to the marker 61 included in the stereo image and the positions of the cameras 23 and 24. The detected position of the marker 61 is used as a correct position.

In the generation of a stereo image, additional images are not captured in step 85 and the output signals of the cameras 23 and 24 during imaging in step 82 may be used.

In step 88, the image comparison unit 42 specifies the distance image in which the abnormality has occurred from among the first distance image and the second distance image. The image comparison unit 42 compares the position of the marker 61 in the stereo image and the position of the marker 61 in the first distance image. If the distance between the positions of the markers 61 in the respective images is not larger than the predetermined judgement value, the image comparison unit 42 determines that the first distance image is normal. If the distance between the positions of the markers 61 in the respective images is larger than the predetermined judgement value, the image comparison unit 42 determines that the first distance image is abnormal. In this way, the image comparison unit 42 specifies the distance image which is abnormal by comparing the distance images with the stereo image.

Furthermore, the image comparison unit 42 compares the position of the marker 61 in the stereo image and the position of the marker 61 in the second distance image. If the distance between the positions of the markers 61 in the respective images is not larger than the judgement value, the image comparison unit 42 can determine that the second distance image is normal. If the distance between the positions of the markers 61 in the respective images is larger than the predetermined judgement value, the image comparison unit 42 can determine that the second distance image is abnormal.

Subsequently, in step 89, the calibration command unit 44 transmits the commands for calibrating the distance image to the distance image generation units 31 and 32 that have generated the abnormal distance images. The calibration command unit 44 transmits the calibration command for adjusting the position of the marker 61 based on the distance image to the position of the marker 61 based on the stereo image.

The error of the distance measured according to the time-of-light flight method is caused by, for example, an error in the light emission timing of the light sources 25 and 26. The distance error uniformly occurs for each part that is included in the distance image. Accordingly, all of distances corresponding to the pixels can be corrected by a single correction method. For example, a constant correction value can be added to or subtracted from the all distances that is detected for the pixels. In this way, the distance image generation units 31 and 32 can calibrate the distance images.

Figure 5:
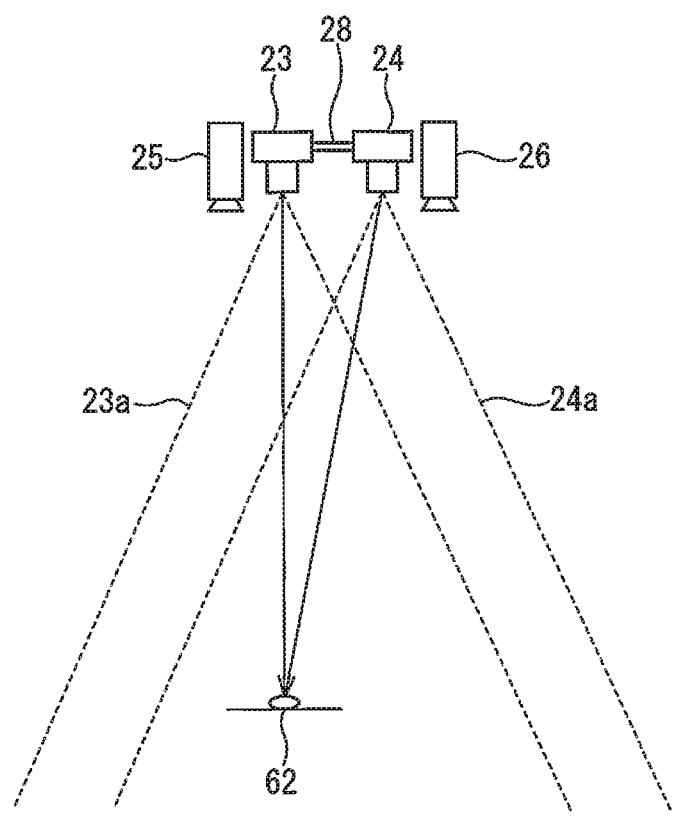
FIG. 5 is a schematic plan view showing the two cameras and the object after the calibration of the distance image.

FIG. 5 shows a schematic plan view of the two cameras and the object after the calibration of the distance images. In this example, the second distance image captured by the second camera 24 is calibrated. In other words, the calibration command unit 44 transmits the calibration command to the second distance image generation unit 32. The position of the object 62 that is specified from the image of the first camera 23 matches with the position of the object 62 that is specified from the image of the second camera 24.

The image processing device 22 of the present embodiment compares the stereo image and the first distance image and compares the stereo image and the second distance image. The image processing device 22 can detect the abnormality in at least one of the first distance image and the second distance image. In the above-mentioned example, the abnormality occurs in the second distance image. The present invention is not limited to this embodiment. The abnormality may occur in each of the first distance image and the second distance image. In this case, the calibration command unit 44 can transmit the command for calibrating the distance image to the first distance image generation unit 31 and the second distance image generation unit 32.

Furthermore, the image comparison unit 42 may compare one of the first distance image and the second distance image with the stereo image. For example, when the first camera is significantly older than the second camera, the first distance image captured by the first camera may be compared with the stereo image in order to detect aging deterioration of the first camera. In this case, the stereo image and the second distance image may not be compared with each other.

In the above-mentioned control, the image comparison unit 42 compares the first distance image and the second distance image before comparing the stereo image and the distance images. The image comparison unit 42 determines the presence or absence of the abnormality in the first distance image and the second distance image. After detecting the presence of an abnormality in the first distance image or the second distance image, the image comparison unit 42 identifies the distance image having the abnormality based on the stereo image.

Abnormalities due to aging deterioration rarely occur simultaneously in both of the first distance image and the second distance image. Thus, the image comparison unit 42 can determine that the abnormality has occurred in one of the first distance image and the second distance image if a predetermined difference appears between the distance images. By adopting this control, the stereo image can be generated only when the abnormality occurs in the distance image. When control is performed so as to determine the presence or absence of the abnormality in the distance image, the stereo image does not need to be generated for each determination, thereby processing time can be shortened.

The image comparison unit 42 may compare the stereo image and the first distance image and then compare the stereo image and the second distance image instead of comparing the first distance image and the second distance image. In other words, the image comparison unit 42 may compare the stereo image and the two distance images so as to identify the distance image having the abnormality without performing control so as to compare the first distance image and the second distance image.

During the generation of the stereo image, the stereo image generation unit 53 performs the control in which a position in the second two-dimensional image, which corresponds to a predetermined part in the first two-dimensional image is identified. For example, the stereo image generation unit 53 performs the control in which a part of the second two-dimensional image, which corresponds to the entrance part 15a in the first two-dimensional image is identified. After that, the parallax is calculated. The control for identifying a corresponding part can be performed by using the luminance of the pixel. For example, in the control for identifying the corresponding part, a matching evaluation function can be used for luminance variations among pixels. In the control for identifying the corresponding part, the calculation amount is increased, thereby the load of the image processing device 22 is increased.

In the present embodiment, the stereo image generation unit 53 can obtain the distance from the camera to a predetermined part based on distance information included in the first distance image or the second distance image. Under the control performed so as to identify a corresponding part, the distance from the camera to the predetermined part can be identified, thereby reducing the search range of the corresponding part. The stereo image generation unit 53 can perform the control so as to identify the corresponding part in a small range. This control can reduce the processing load of the image processing device 22.

Furthermore, in the present embodiment, the marker 61 is set in advance as the measurement point for measuring the position in the area in which the first camera 23 captures the image and the area in which the second camera 24 captures the image. The image comparison unit 42 compares the first distance image and the second distance image at the marker 61. Moreover, the image comparison unit 42 compares the stereo image and at least one of the first distance image and the second distance image so as to detect the abnormality of the distance image.

In this way, when the measurement point that corresponds to a part of the image is set in advance, the stereo image generation unit 53 only needs to generate the stereo image of the area around the measurement point. When the stereo image is generated, the stereo image generation unit 53 only needs to correlate the positions of the first two-dimensional image and the second two-dimensional image in the area around the measurement point.

Moreover, the position of the measurement point can be estimated from at least one of the position of the measurement point based on the first distance image and the position of the measurement point based on the second distance image. Thus, the stereo image generation unit 53 can perform the control so as to identify the point corresponding to the measurement point by using the estimated position. This control can reduce the load of the image processing device 22 in the calculation of the position of the measurement point. Furthermore, the stereo image generation unit 53 can calculate the parallax of the marker 61 after the correlation. The stereo image generation unit 53 can calculate the distance to the marker 61 based on the parallax.

The image comparison unit may recognize an abnormality of the distance image by comparing the positions of any parts other than the predetermined measurement point. For example, the image comparison unit selects a part in which an edge of the object is clear in the stereo image. The image comparison unit specifies a part corresponding to the selected part in the distance image. The image comparison unit may recognize the abnormality of the distance image by using the part.

As described above, the distance error caused by the time-of-light flight method uniformly occurs in the captured image. In other words, local error in which distance accuracy in the part of distance image is deteriorated does not occur. Thus, the part of the image is preferably set in advance for the recognition of the abnormality of the distance image. Moreover, the part of the image is preferably selected as a stationary part.

The image processing device 22 of the present embodiment generates the distance images from the output signal of the first camera 23 and the output signal of the second camera 24. Furthermore, the image processing device 22 has the function of generating the stereo image based on the output signal of the first camera 23 and the output signal of the second camera 24. The image processing device 22 of the present embodiment combines the stereo image and one of the first distance image and the second distance image by using these functions. By combination of the distance image and the stereo image, the image with correct distance information can be generated.

Figure 6:
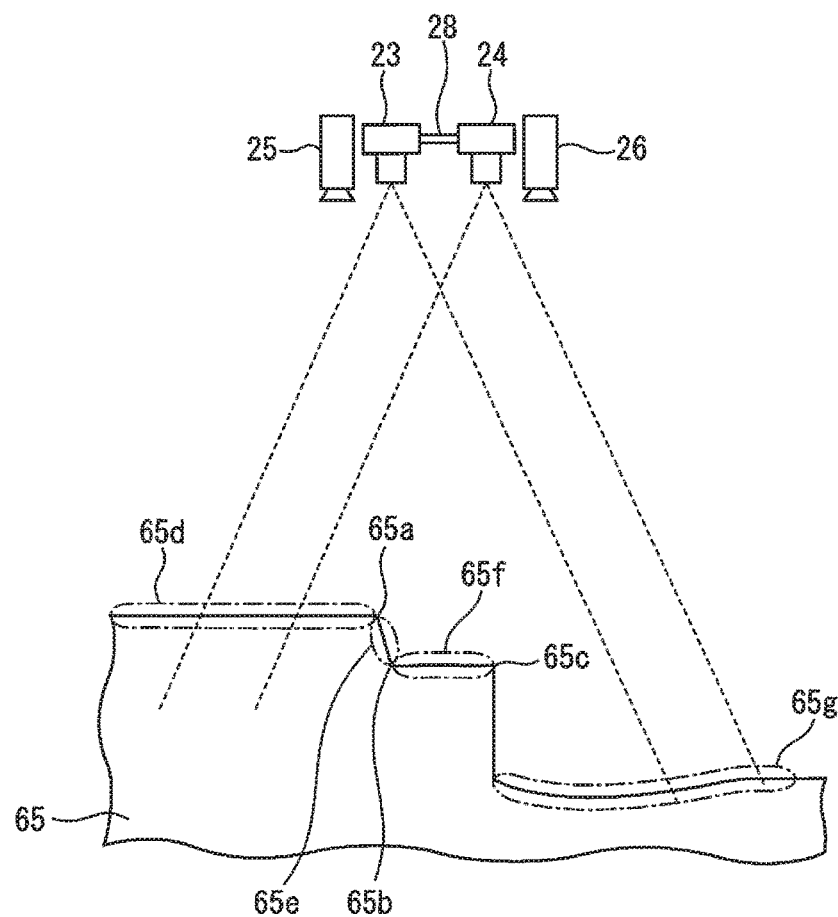
FIG. 6 is a schematic plan view showing the two cameras and another object.

FIG. 6 is a schematic plan view showing the two cameras and an object. An object 65 has linear parts 65a, 65b, and 65c and surface parts 65d, 65e, 65f, and 65g. The surface parts 65d, 65e, 65f, and 65g serve as the surface of the captured image. The linear parts 65a, 65b, and 65c serve as lines, e.g., the edges of a captured image. The linear part includes a pattern formed on the surface part in addition to the edge.

In the distance image captured by the time-of-light flight method, a correct distance (position) can be detected in the surface parts 65d, 65e, 65f, and 65g since the light that is reflected from the object 65 is obtained. However, at the linear parts 65a, 65b, and 65c, an incorrect distance (position) may be detected. For example, in the linear parts 65a, 65b, and 65c, the object 65 considerably varies in height in the imaging range corresponding to one pixel. In this case, a value close to the intermediate value of the heights may be detected or a height value that is completely different from the actual height may be detected.

In contrast, in a stereo image, the distance (position) of the linear parts 65a, 65b, and 65c can be correctly detected, whereas an incorrect distance (position) may be detected on the surface parts 65d, 65e, 65f, and 65g. For example, the surface part 65g is smoothly curved and thus a parallax does not occur in the surface part 65g. This configuration may prevent the acquisition of the distance (position).

The image processing device 22 of the present embodiment generates a distance image by combining the linear part of the stereo image and the surface part of the distance image. Referring to FIG. 2, the arithmetic processing unit 35 includes a composite image generation unit 43 that combines the stereo image and one of the first distance image and the second distance image.

Figure 7:
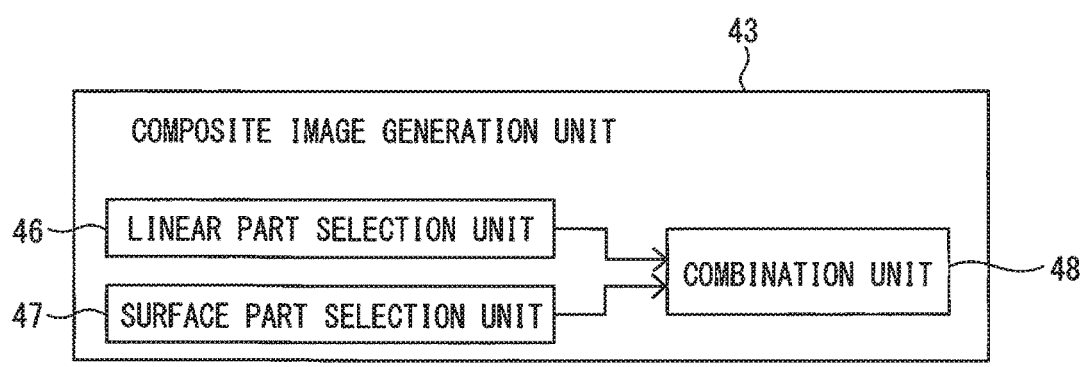
FIG. 7 is a block diagram of a composite image generation unit according to the embodiment.

FIG. 7 shows a block diagram of the composite image generation unit. The composite image generation unit 43 includes a linear part selection unit 46 that selects a linear part from the stereo image. The linear part selection unit 46 extracts a linearly extending part from the stereo image. The composite image generation unit 43 includes a surface part selection unit 47 that selects a surface part from one distance image of the first distance image and the second distance image. The distance image to be selected from the first distance image and the second distance image can be determined in advance. In the captured image, parts other than the linear parts are surface parts. Thus, for example, the surface part selection unit 47 can select a part other than a part selected by the linear part selection unit 46.

The composite image generation unit 43 includes a combination unit 48 that generates a distance image by combining the linear part selected by the linear part selection unit 46 and the surface part selected by the surface part selection unit 47. The combination unit 48 can combine the stereo image and the distance image by using the stereo image in a linear part and the distance image in a surface part. The image generated by the combination unit 48 serves as a distance image including excellent distance information, in both parts of the surface part and the linear part. Such the composite image can be displayed on the display unit 38 of the image processing device 22. Moreover, the image processing device 22 may transmit the composite image to the other apparatus.

In the image apparatus of the present embodiment, the first light source is disposed for the first camera while the second light source is disposed for the second camera. The present invention is not limited to this configuration. The first light source and the second light source may be formed into a single unit. In other words, a common light source may be provided so as to work in synchronization with the first camera and in synchronization with the second camera. In this case, the common light source emits light when the image is captured by the first camera and when the image is captured by the second camera. Alternatively, the first camera and the second camera may simultaneously capture images in synchronization with the light emission from the common light source.

The image apparatus of the present embodiment is disposed in the robot system. The present invention is not limited to this configuration. The image apparatus can be disposed in any apparatus that measures the distance from an object or a person or detects the position of an object or a person. The image apparatus of the present embodiment is applicable to, for example, an image apparatus that detects a person entering a building and an image apparatus that is mounted in an automobile in order to avoid collision of the automobile.

An aspect of the present disclosure can provide an image apparatus that detects the abnormality of the distance image.

In the above-mentioned control, the order of steps can be optionally changed as long as the functions and effects remain the same.

The embodiment can be combined as deemed appropriate. In the drawings, the same or equivalent parts are indicated by the same symbols. The embodiment is merely exemplary and does not limit the invention. The embodiment includes modifications thereof described in claims.

The invention claimed is:

1. An image apparatus comprising:
a first imaging unit that captures an image;
a second imaging unit that is disposed at a predetermined position relative to the first imaging unit and that captures an image;
a first light source that emits light to an area in which the first imaging unit captures an image;
a second light source that emits light to an area in which the second imaging unit captures an image; and
an image processing unit that processes an output signal of the first imaging unit and an output signal of the second imaging unit;
wherein the image processing unit includes:
a first distance image generation unit that generates a first distance image including distance information from the output signal of the first imaging unit based on a flight time of light;
a second distance image generation unit that generates a second distance image including distance information from the output signal of the second imaging unit based on a flight time of light;
a first two-dimensional image generation unit that generates a first two-dimensional image from the output signal of the first imaging unit;
a second two-dimensional image generation unit that generates a second two-dimensional image from the output signal of the second imaging unit;
a stereo image generation unit that generates a stereo image including distance information based on the first two-dimensional image and the second two-dimensional image; and
an image comparison unit that compares the stereo image and at least one of the first distance image and the second distance image and detects an abnormality of at least one of the first distance image and the second distance image.

2. The image apparatus according to claim 1, wherein a measurement point for measuring a position is set in advance in an area in which the first imaging unit and the second imaging unit capture images, and the image comparison unit detects the abnormality by comparing the stereo image and at least one of the first distance image and the second distance image at the measurement point.

3. The image apparatus according to claim 1, wherein the image comparison unit
   detects presence of the abnormality in the first distance image or the second distance image by comparing the first distance image and the second distance image, and
   specifies a distance image having the abnormality based on the stereo image.

4. The image apparatus according to claim 1, wherein the image processing unit includes a calibration command unit that transmits a command for calibrating an image to the first distance image generation unit or the second distance image generation unit, and
   the calibration command unit transmits the command for calibration so as to match a distance image with the stereo image, to a distance image generation unit that generates a distance image having the abnormality.

5. An image apparatus comprising:
   a first imaging unit that captures an image;
   a second imaging unit that is disposed at a predetermined position relative to the first imaging unit and that captures an image;
   a first light source that emits light to an area in which the first imaging unit captures an image;
   a second light source that emits light to an area in which the second imaging unit captures an image; and
   an image processing unit that processes an output signal of the first imaging unit and an output signal of the second imaging unit;
   wherein the image processing unit includes:
      a first distance image generation unit that generates a first distance image including distance information from the output signal of the first imaging unit based on a flight time of light;
      a second distance image generation unit that generates a second distance image including distance information from the output signal of the second imaging unit based on a flight time of light;
      a first two-dimensional image generation unit that generates a first two-dimensional image from the output signal of the first imaging unit;
      a second two-dimensional image generation unit that generates a second two-dimensional image from the output signal of the second imaging unit;
      a stereo image generation unit that generates a stereo image including distance information based on the first two-dimensional image and the second two-dimensional image; and
      an image comparison unit that compares the stereo image and at least one of the first distance image and the second distance image and detects an abnormality of at least one of the first distance image and the second distance image,
   wherein
      the image processing unit includes a composite image generation unit that combines the stereo image and one of the first distance image and the second distance image, and
      the composite image generation unit includes a linear part selection unit that selects a linear part from the stereo image, a surface part selection unit that selects a surface part from at least one of the distance images, and a combination unit that generates a distance image by combining the linear part selected by the linear part selection unit and the surface part selected by the surface part selection unit.

6. An image apparatus, comprising:
   a first camera;
   a second camera disposed at a predetermined position relative to the first camera;
   a first light source configured to emit light to an area in which the first camera is configured to capture an image;
   a second light source configured to emit light to an area in which the second camera is configured to capture an image; and
   a processor configured to process an output signal of the first camera and an output signal of the second camera,
   wherein the processor is configured to:
      generate a first distance image including distance information from the output signal of the first camera based on a flight time of light;
      generate a second distance image including distance information from the output signal of the second camera based on a flight time of light;
      generate a first two-dimensional image from the output signal of the first camera;
      generate a second two-dimensional image from the output signal of the second camera;
      generate a stereo image including distance information based on the first two-dimensional image and the second two-dimensional image; and
      compare the stereo image and at least one of the first distance image and the second distance image and detect an abnormality of said at least one of the first distance image and the second distance image.

* * * * *